United States Patent [19]
Shanks

[11] Patent Number: 4,997,271
[45] Date of Patent: Mar. 5, 1991

[54] METHOD OF AND AN APPARATUS FOR PRODUCING A REQUIRED VISUAL SIGNAL FOR DIRECT OBSERVATION FROM A FIRST SOURCE OF LIGHT IN THE PRESENCE OF A SECOND SOURCE OF LIGHT

[75] Inventor: Ian A. Shanks, Penn, England
[73] Assignee: Thorn EMI plc, London, England
[21] Appl. No.: 416,768
[22] Filed: Oct. 4, 1989

[30] Foreign Application Priority Data
Oct. 6, 1988 [GB] United Kingdom ............... 8823523

[51] Int. Cl.$^5$ ............................................. G03B 21/00
[52] U.S. Cl. .................................. 353/122; 353/121
[58] Field of Search ........... 350/117, 123, 127, 331 R; 353/122, 121; 388/231, 236, 241, 242

[56] References Cited
U.S. PATENT DOCUMENTS
4,072,411 2/1978 Frank et al. ........................ 353/121

FOREIGN PATENT DOCUMENTS
0165632 8/1985 Japan .................................. 350/117

Primary Examiner—Harry N. Haroian
Attorney, Agent, or Firm—Fleit, Jacobson, Cohn, Price, Holman & Stern

[57] ABSTRACT

A required visual signal for direct observation is produced from a first source of light in the presence of a second source of light, such as ambient light. Light is transmitted from the first source to a defined surface or defined region distant from the first source. A means for modulating light is operated between at least a first mode and a second mode. This operation is synchronized with a varying of the intensity of at least one of the sources of light at or above a given frequency equal to or greater than the critical fusion frequency for the size and luminance of the required visual signal. When the modulating means is in the first mode, this allows the required visual signal to be directly observed on the defined surface or in the defined region. When the modulating means is in the second mode, this allows the effect produced by any light from the second source incident on the defined surface or in the defined region to be reduced.

30 Claims, 9 Drawing Sheets

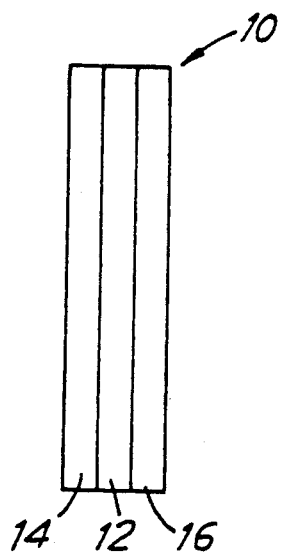
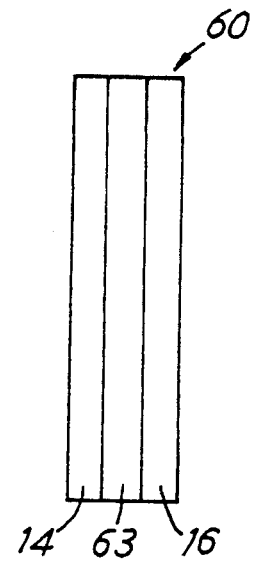
FIG.2  FIG.6
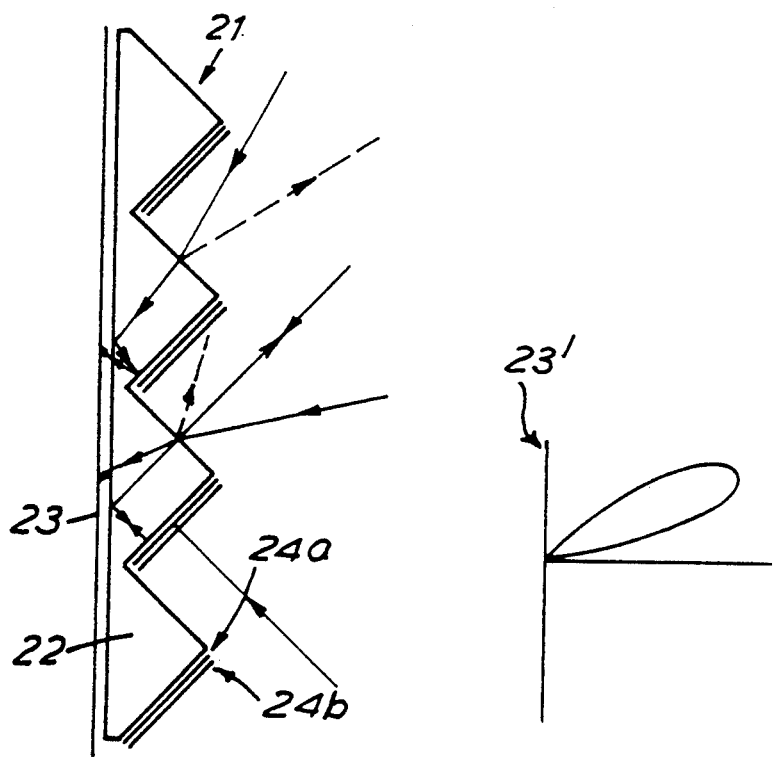
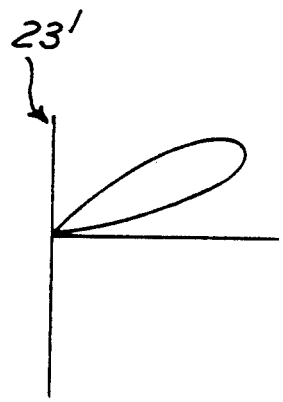
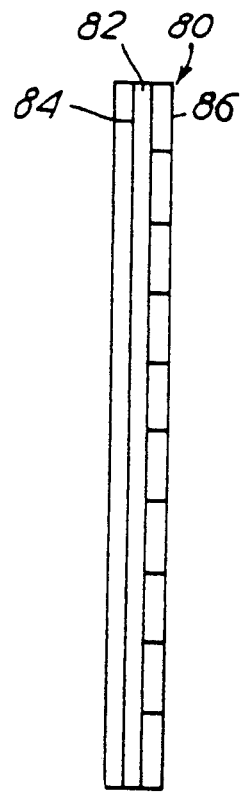
FIG.3a  FIG.3b  FIG.10

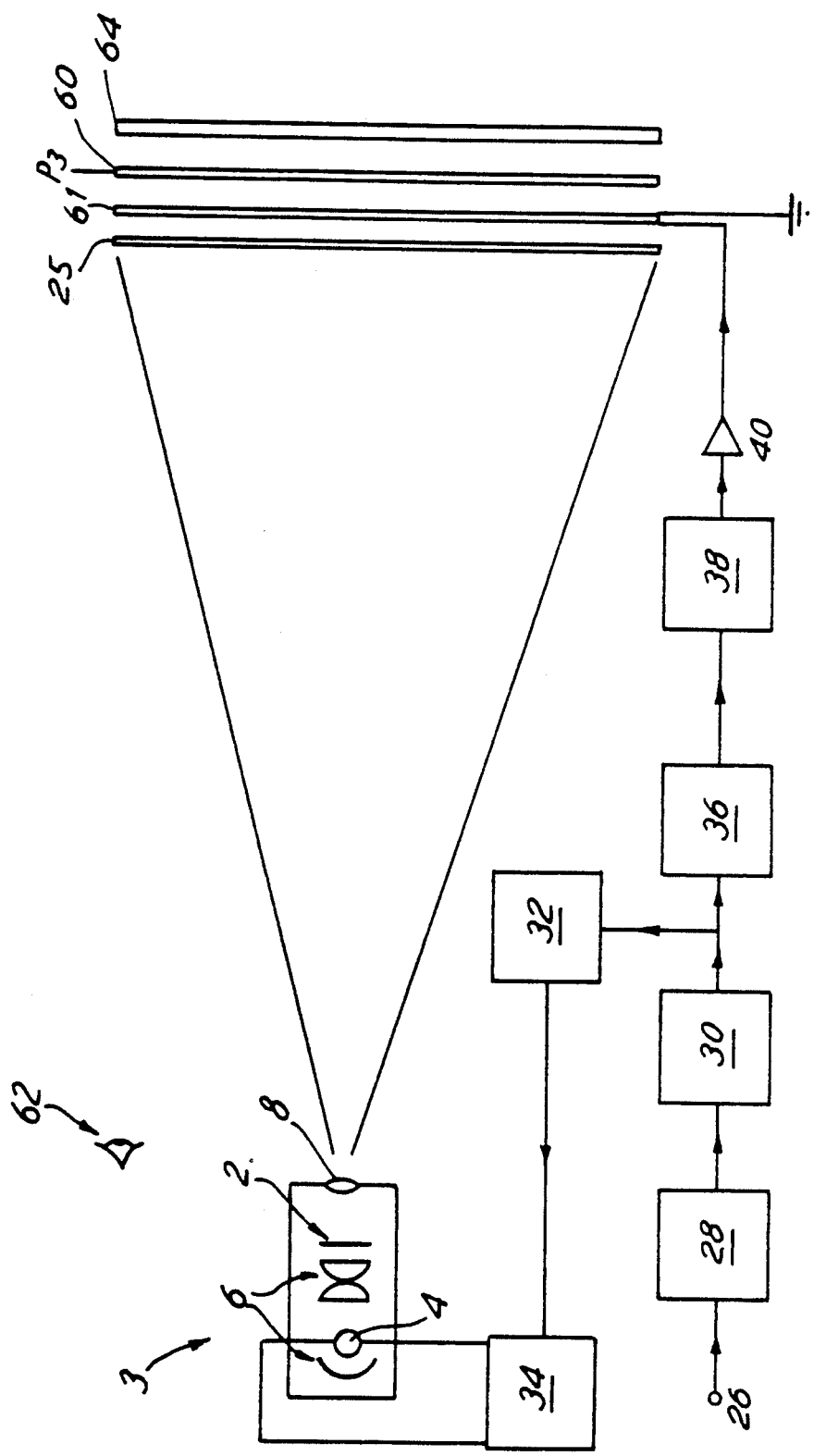

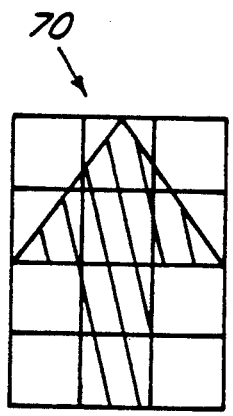
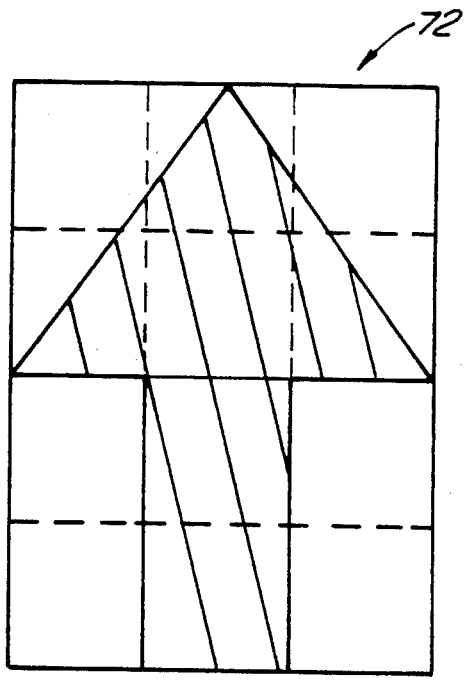
FIG.7
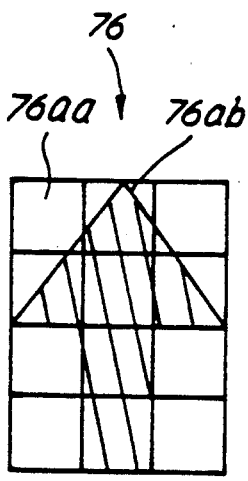
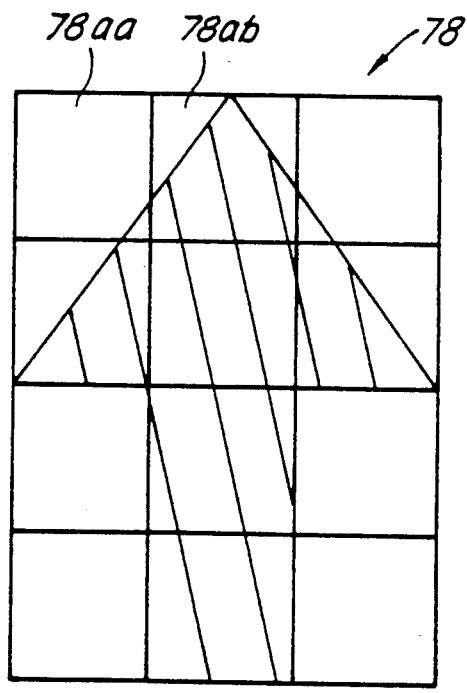
FIG.8

METHOD OF AND AN APPARATUS FOR PRODUCING A REQUIRED VISUAL SIGNAL FOR DIRECT OBSERVATION FROM A FIRST SOURCE OF LIGHT IN THE PRESENCE OF A SECOND SOURCE OF LIGHT

The present invention relates to the provision of a method of and an apparatus for producing a required visual signal for direct observation from a first source of light in the presence of a second source of light. In particular, the invention relates to such a method and an apparatus in which the effect of unwanted light from the second source of light, producing visual signals other than the required visual signal, is reduced.

One type of visual signal is the image produced by a video, slide or movie projector. Generally, the use of such projectors is limited by the need to use them in situations where the level of ambient lighting is restricted. This is because the ambient light scattered or reflected from the screen degrades the contrast in the projected image. Alternatively, or in addition, it is necessary to use a projector lamp of high average intensity.

Another type of visual signal is the appearance of a first area as viewed from a second area, the two areas being separated by a partition such that the appearance of the second area cannot be viewed from the first area, i.e. the partition is effective as a one-way window. Known one way windows, e.g. a half-silvered mirror, are effective if the second area is illuminated at a lower luminance than the first area but not effective if the second area is illuminated at a higher luminance.

It is an object of the present invention to provide an improved method of producing a required visual signal for observation.

According to a first aspect of the present invention there is provided a method of producing a required visual signal for direct observation from a first source of light in the presence of a second source of light, the method including the steps of:

transmitting light from said first source to produce a required visual signal on a defined surface or in a defined region distant from said first source;

operating a means for modulating light between at least a first mode and a second mode;

and varying the intensity of at least one of the sources of light at or above a given frequency;

wherein the operation of the modulating means and the varying of said intensity are synchronised so that said modulating means in said first mode allows the required visual signal to be directly observed on said defined surface or in said defined region and said modulating means in said second mode allows the effect produced by any light from said second source incident on said defined surface or in said defined region to be reduced and said given frequency is equal to or greater than the critical fusion frequency for the size and luminance of said required visual signal.

In this way, the required visual signal can be observed when said modulating means is in said first mode, the integral effect over time when said modulating means is in said first mode being sufficient to produce the required visual signal. However, as any light from said second source, e.g. ambient light, is attenuated when said modulating means is in said second mode, the contrast between the required visual signal and the noise produced by any light from said second source is improved.

According to a second aspect of the present invention, there is provided an apparatus for use in a method of producing a required visual signal on a defined surface or in a defined region for direct observation from a first source of light in the presence of a second source of light, the apparatus comprising means for modulating light, the modulating means having at least a first mode and a second mode, in use, said modulating means in said first mode allowing a said required visual signal to be directly observed on a said defined surface or in a said defined region distant from a said first source and said modulating means in said second mode allowing the effect produced by any light from a said second source incident on a said defined surface or in a said defined region to be reduced and said modulating means being operable between said first mode and said second mode at or above a given frequency equal to or greater than the citical fusion frequency for the size and luminance of a said required visual signal.

Such an apparatus can be used to implement the method provided in accordance with the first aspect of the present invention.

Embodiments of the present invention will now be described, by way of example only, and with reference to the accompanying schematic drawings in which:

FIG. 2 shows a modulating means used in the method of FIG. 1;

FIG. 3a shows a directional reflector which may be used in the method of FIG. 1;

FIG. 3b is a polar diagram;

FIGS. 4 and 5 show a second and a third method of producing a projected image;

FIG. 6 shows a modulating means used in the method of FIG. 5;

FIGS. 7 and 8 illustrate variations to the methods of FIGS. 1, 4 and 5;

FIG. 10 shows a modulating means used in the method of FIG. 9;

Figure 1:
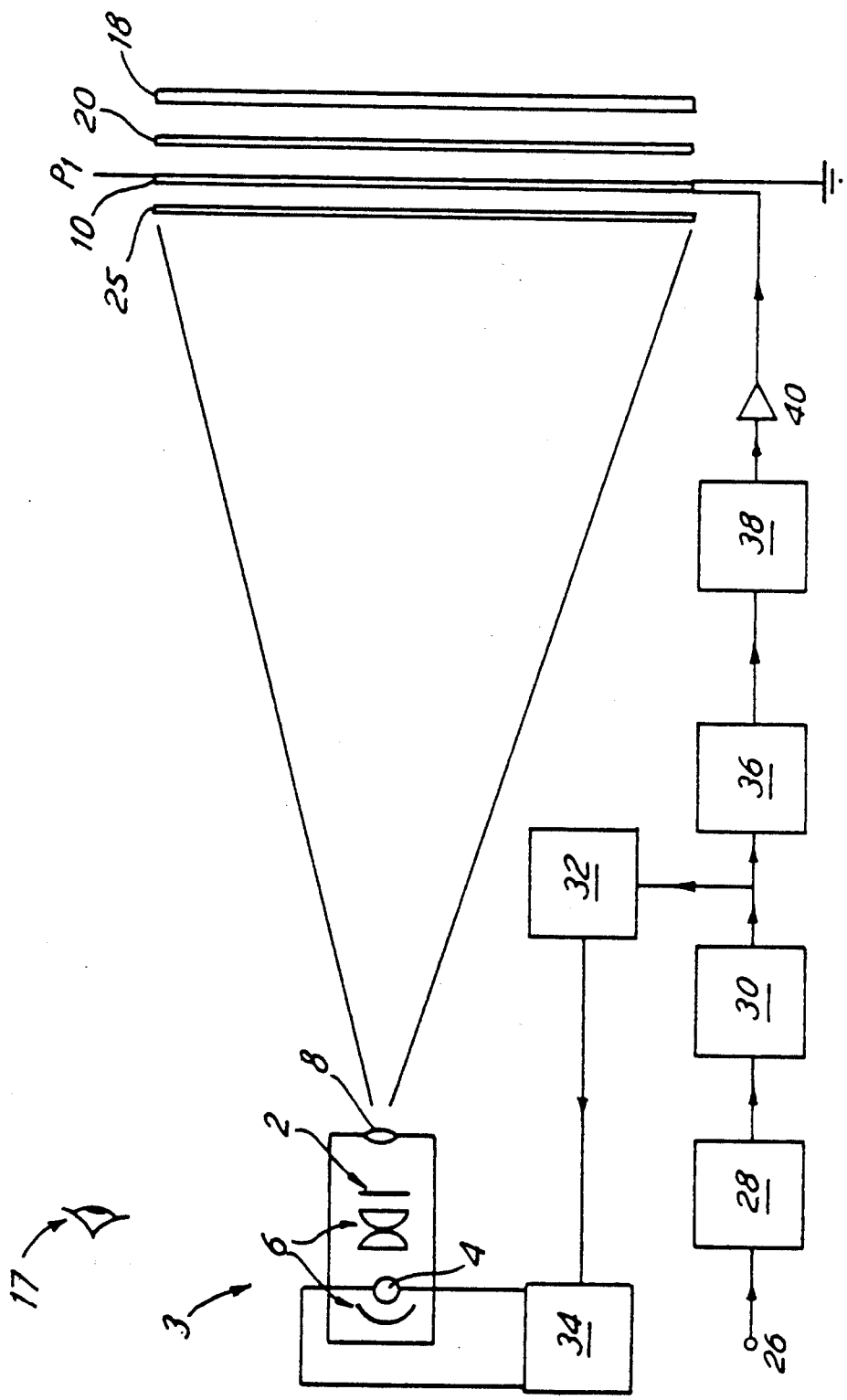
FIG. 1 shows a first method of producing a projected image.

A first embodiment of a first method of enhancing the contrast between an image projected by a first source of light onto a defined surface, i.e. a screen, and the noise produced by ambient light from a second source of light is illustrated in FIG. 1. A source picture 2, such as a conventional LCD (e.g. an active matrix, a multiplexed twisted nematic or a ferroelectric colour TV LCD), a photographic transparency, or a movie film frame, is projected from a projector 3 using a Xenon strobe lamp 4, or another source of light whose intensity can be varied. The projector is otherwise of a conventional type or may be a lensless shadow projector, e.g. of the Linnebach type (i.e. using a 'point' source to project an enlarged colour shadow image onto a screen).

The lamp 4 is flashed at a given frequency, typically of 50 Hz with each flash lasting for an interval in the range of from of the order of 1 microsecond to a few milliseconds. In order to produce an image which appears continuous, i.e. with no flicker, the given frequency has to be equal to or greater than a critical fusion frequency, which is affected by both the luminance and the size of the image. The luminance of a continuous image so produced is equal to the average luminance of the flashing image.

The light from the flashing lamp 4 is projected via an optical collimation system 6 and a projection lens 8 and focussed onto a plane $P_1$ in which is situated means 10 for modulating light. The modulating means 10 provides the defined surface and is operable between a first mode and a second mode, operation being synchronised with the variation of light intensity so that more light is emitted to project the image onto the plane when the modulating means 10 is in the first mode.

The modulating means 10 comprises an electro-optic layer containing a liquid crystal, e.g. a cholesteric to nematic phase change cell, or preferably, as shown in FIG. 2, a sheet 12 of plastics material which contains microencapsulated droplets of a nematic liquid crystal material (manufactured, inter alia, under the name NCAP by Taliq Corporation, Sunnyvale, Calif., U.S.A.). On either side of the sheet 8 is laminated a plastic foil 14, 16 with transparent indium tin oxide electrodes on its surface. This forms a large area, e.g. 1 m × 3 m, electro-optic shutter which goes from translucent to transparent when a potential difference is applied. Accordingly, the material can be rapidly switched (with a response time of about 1 ms to 5 ms) electrically between a first mode in which the modulating means 10 is translucent and a second mode in which the modulating means is transparent.

The modulating means 10 in the first mode forms a translucent screen from which an image 9 (i.e. the required visual signal) is reflected to be directly observed by an observer (indicated at 17) on the same side of the modulating means as the projector 3 (i.e. front-projection). In the second mode, the modulating means 10 is transparent and so no or little light can be diffusely reflected from the plane $P_1$ to the observer. In this way, the effect produced from ambient light incident on the defined surface of the modulating means is reduced. One or more layers 18, 20 are provided behind the modulating means 10 to prevent ambient light which reaches behind the modulating means 10 being observed by the observer 17 when the modulating means is transparent. A black material would be suitable for one of the layers 18 to absorb ambient light incident thereon which reaches behind the modulating means 10. A louvred sheet 20 can be used behind the modulating means 10, further to prevent ambient light which reaches behind the modulating means being seen by the observer. In a preferred embodiment, the layer 18 is a front-silvered mirror and is used in conjunction with the louvred sheet 20. The front-silvered mirror 18 would reflect, say, the image of a dark wall when the modulating means is in the second mode and the mainly forward scattered light of the image when the modulating means is in the first mode to give a brighter reflected image.

Alternatively a directional reflector can be used which reflects light incident thereon within one or more predetermined ranges of angles but absorbs light incident thereon outside the one or more predetermined ranges of angles. In such a case, the projector is positioned to project light onto the modulating means 10 and the directional reflector at angles within the one or more predetermined ranges of angles while the observer 17 is positioned to view the modulating means 10 outside the one or more predetermined ranges of angles. Thus when the modulating means 10 is in the first (scattering) mode, the image reflected from the modulating means 10 is enhanced by light from the directional reflector which can be scattered by the modulating means 10 towards the observer 17 whereas when the modulating means 10 is in the second (transparent) mode, light incident on the directional reflector is either absorbed or reflected away from the observer 17. One type of directional reflector is disclosed in U.S. Pat. No. 4,726,662 (Cromack). Another type of directional reflector 21 is shown in FIG. 3a. The reflector 21 comprises a sheet of plastics material 22, one side of which is embossed with a series of uniform parallel prisms, and an absorbing layer 23 extending along and separated from the other surface of the prismatic sheet 22. On the embossed side of the prismatic sheet, every other face has both a reflective layer 24a and an absorbing layer 24b coated thereon. As indicated by the light rays shown and the polar diagram of reflectivity (axis 23' indicating the surface 23) light incident on the reflector 21 within a predetermined range of angles is reflected whereas light incident outside the predetermined range is absorbed.

FIG. 1 also shows an anti-reflection film 25 in front of the modulating means to reduce reflection of ambient light incident on the front surfaces of the modulating means 10. Thus the flashing image is maximally directed to the eye of the observer 17 when the modulating means 10 is in the first mode, whereas any ambient light is attenuated during intervals between the flashes. Accordingly, the contrast between the projected image, i.e. the required visual signal, and the noise produced by scattered ambient light from a second source of light is improved.

Thus, a projected image of the same contrast as prior art projected images can be produced by the method of the present invention using a light source of lower average power, or alternatively a projected image of better contrast can be produced using a light source of the same average power.

FIG. 1 also shows schematically the electrical circuitry used in the method. Waveforms generated from a source 26, optionally modified by means 28, control a pulse generator 30. The source 26 could be a 50 Hz AC mains supply or the field synchronisation pulses from a television, e.g. an LCD TV at 2, with the generated waveforms being modified by means 28 such as a full-wave rectifier and comparator. Alternatively, the source 26 could be a photodetector which measures pulsatile ambient light, the photodetector being connected to the input of means 28 such as a comparator which triggers the lamp 4 and the modulating means 10 when the ambient light is at a minimum intensity.

The source 26 and pulse generator 30 are common to both the circuit for powering the lamp 4 and the circuit for switching the modulating means 10 and synchronise the flashing of the lamp 4 and the switching of the modulating means 10. The circuit for the lamp 4 further comprises a pulse delay unit 32 and the flash lamp drive electronics 34, e.g. a standard drive unit for a strobe lamp. The circuit to switch the modulating means further comprises a pulse delay unit 36, a drive waveform generator 38 (e.g. an arbitrary waveform generator manufactured by Wavetech Ltd.) and an amplifier 40 to apply a potential difference, via the electrodes 14, 16 to the sheet 12. The pulse delay units 32, 36 so affect the pulses applied to flash the lamp 4 and switch the modulating means 10 that a zero or low potential difference is applied to switch the modulating means 10 to the first mode, translucent, when power is supplied to flash the lamp 4 and a potential difference of e.g. 60 V rms is applied, allowing the modulating means 10 to switch to the second mode, transparent, when no power is supplied to the lamp 4.

The use of a photodetector as the source 26 enables the contrast between the image and noise produced by ambient light to be further improved. The photodetector measures the ambient light, e.g. from a fluorescent tube or a discharge lamp and is able to detect times at which the light output of the fluorescent tube is minimal. This information is passed to a comparator 28 which causes the pulse generator 30 to generate pulses such that the modulating means 10 is in the first mode, i.e. effective as a screen, when the light output of the fluorescent tube is minimal. Accordingly the ambient light reflected from the modulating means is further attenuated.

It is further envisaged that an improvement in contrast of the projected image can be produced in accordance with the present invention by synchronizing the operation of the modulating means 10 between the first and second modes with a variation in intensity of the ambient light alone, so that there is more ambient light when the modulating means is in the second mode than when the modulating means is in the first mode. Such a variation in intensity is inherent when the source of the ambient light is a fluorescent tube or discharge lamp run from an AC mains supply. Alternatively, if the ambient light is continuous, e.g. daylight from a window, the window may be made from NCAP or dyed NCAP which is switched to produce a minimum in the ambient light.

The method described hereinbefore can also be used with modulating means having other transmissive characteristics in the first and second modes. The essential feature for this method is that, the modulating means is effective as a reflective screen in the first mode and reflects less light in the second mode than in the first mode. Accordingly the required visual signal, the image reflected from the modulating means in the first mode and seen by an observer, is the integral effect of flashing images maximally directed to the eye of the observer whereas any ambient light incident on either the front or the back of the modulating means is attenuated during the intervals between the flashes when the modulating means is in the second mode.

Figure 4:
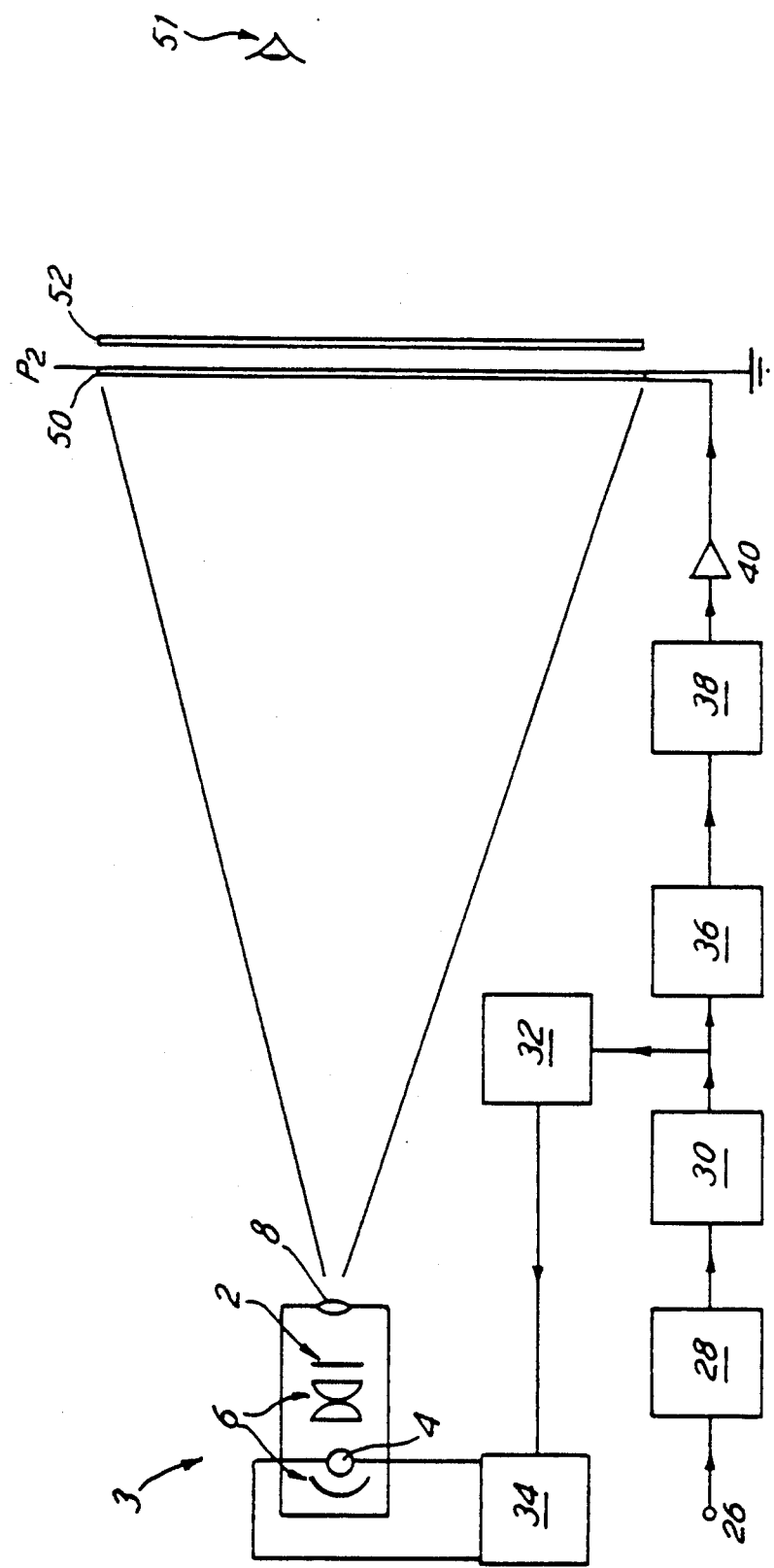

A second embodiment showing a second method of enhancing the contrast between an image projected onto a screen and the noise produced by ambient light is illustrated in FIG. 4. The apparatus used is similar to that used in the first method and accordingly like parts are designated by like reference numerals.

The second method differs from the first method in that it is for use in a back-projection system. Light to form an image is focussed onto a plane $P_2$ in which is situated means 50 for modulating light. The modulating means 50 provides a defined surface and comprises a combination of dyed NCAP material with a translucent sheet and is operable between a first mode and a second mode. In the first mode, the modulating means 50 is translucent and forms a scattering screen from which light is scattered forward to produce an image which can be seen by an observer (indicated at 51) on the other side of the modulating means 50. In the second mode, the modulating means 50 is opaque and absorbing and accordingly light incident thereon is not scattered forward or reflected to the observer 51. Thus, as with the first method, the flashing images are maximally directed to the eye of the observer 51 i.e. when the modulating means 50 is in the first mode whereas any ambient is not scattered to the observer 51 during intervals between the flashes. Accordingly, the contrast between the projected image, i.e. the required visual signal and the noise produced by scattered ambient light is improved. An anti-reflection film 52 in front of the modulating means 50 reduces reflection of ambient light incident on the front surfaces of the modulating means 50.

As with the first method, it is envisaged that an improvement in contrast of a projected image can also be produced by synchronizing the operation of the modulating means with a variation in intensity of ambient light produced from a second source of light alone, or in addition to a variation in intensity of light from the projector.

Alternatively, in another embodiment (not shown), the modulating means is transparent in the first mode and opaque and absorbing in the second mode. An assembly comprising a Fresnel lens and a lenticular screen (commonly used in prior art back-projector systems) is provided between the projector and the modulating means. The combination of the modulating means and the assembly distributes light incident thereon when the modulating means is in the first mode and prevents light from being distributed therefrom when the modulating means is in the second mode.

A third method of enhancing the contrast between an image projected onto a screen and the noise produced by ambient light is exemplified by an embodiment of the present invention shown in FIGS. 5 and 6. This method uses an apparatus similar to that shown in FIGS. 1 and 2 and accordingly like parts are designated by like reference numerals.

The third method is for use in a front projection system. Light to form an image is focussed onto a plane $P_3$ in which is situated a reflective screen 60 formed of a translucent material or of an opaque and reflective material, such as aluminium paint, glass beads or lenticles. The reflective screen 60 provides the defined surface. Means 61 for modulating light is provided between the projector 3 and the screen 60. The modulating means 60 is effective as an electro-optic shutter, being operable between a first mode in which it is transparent and a second mode in which it is absorbing, i.e. non-transparent. In the first mode, the modulating means 61 allows light from the flashing lamp 4 to be incident on the reflective screen and form an image which can be observed by an observer (indicated at 62) in front of the modulating means 61. In the second mode, the modulating means is absorbing and so prevents ambient light incident on the front surface of the modulating means 61 being reflected to the observer 62 while also preventing ambient light reaching the back surface of the modulating means 61 from being transmitted towards the observer 62. Thus, the effect of light incident on the defined surface of the modulating means is reduced.

As shown in FIG. 6, the modulating means comprises a sheet 63 of plastics material contains microencapsulated droplets of a nematic liquid crystal material including a dissolved dichroic dye (dyed NCAP manufactured, inter alia, by Taliq Corporation, Sunnyvale, Calif., U.S.A.). Such a material goes from absorbing to transparent when a potential difference is applied between the two transparent electrodes 14 and 16.

FIG. 5 also shows an anti-reflection film 22 in front of the modulating means 61 to reduce reflection of ambient light incident on the front surfaces of the modulating means 60 and an opaque layer 64 of a material which prevents ambient light from being incident on the back surface of the screen 60. Suitable materials for such a layer 64 include a front-silvered material and an absorbing black material. Thus, as with the first and second methods, this third method improves the contrast between the projected image, i.e. the required visual signal, and the noise produced by ambient light.

In a modification of the embodiment of FIGS. 5 and 6, a reflective screen is used which has six dichroic layers containing cholesteric liquid crystal material, in the form of liquid crystal polymer layers or printed layers of emulsified or dispersed cholesteric droplets. Because of the properties of the cholesteric material, the layers of the reflective screen can be arranged to reflect light of wavelengths in narrow spectral bands in the red, green and blue parts of the spectrum. (Two layers with opposite senses of pitch are used for each spectral band required so that both left-handed and right-handed senses of circular polerisation are reflected). Thus, when ambient light, such as daylight or normal artifical light, which has a broad spectral distribution is incident on the screen, the major part of the energy carried is not reflected but transmitted by the screen. Only a relatively small proportion of the ambient light is reflected. Such a screen is used in conjunction with a projector with light sources emitting light of wavelengths in the narrow spectral bands reflected by the screen. As the brightness of the projected image can be controlled from the projector whilst the effect of ambient light is reduced, the use of this screen further enhances the contrast between the projected image and ambient light.

As with the first and second methods, it is envisaged that an improvement in contrast of a projected image can also be produced by synchronizing the operation of the modulating means with a variation in intensity of ambient light produced from a second source of light alone, or in addition to a variation in intensity of light from the projector.

In a further modification of this method, the modulating means is provided in the form of a pair of spectacles or goggles worn by the observer.

The embodiments of the invention described hereinbefore have used a single source of light to project an image onto a single modulating means. For ease of manufacture or operation, the modulating means could be constructed as a sheet of NCAP material with a plurality of electrodes on either side, optionally each with its own electronic drive circuit.

The resolution of the image produced can be increased by using a plurality of projectors to form a plurality of interleaved or adjacent and abutting images of matching average luminance on the modulating means. FIG. 7 shows a source picture 70 which has been divided into sections to be projected as an image by an array of M×N, in this case 4×3 projectors. Each projector projects a respective section of the source picture onto the modulating means to form an image. The composite image 72 produced is a matrix of images with no gaps therebetween.

A first modification of the methods described hereinbefore uses such an array of projectors to produce a composite image. This is produced on a modulating means which can be switched between a first and a second mode to effect a screen in the first mode. The light sources of the projectors are flashed simultaneously and in synchronism with the switching of the modulating means such that images are projected when the modulating means is in the first mode.

In a second modification, as shown in FIG. 8, a source picture 76 is divided into sections 76aa, 76ab, . . . 76mn to be projected to produce an image by an array of M×N projectors. The screen 78 on which the image is to be projected is formed as an array of M×N modulating means 78aa, 78ab, . . . 78mn. Each modulating means (designated generally 78xy) is associated with a respective projector and flashing light source such that the modulating means 78xy is in the first mode to effect a screen when the light source of the respective projector is on, projecting an image.

The modulating means 78xy can be switched independently of one another. In this way, the transmissive characteristics of a particular modulating means can be adjusted to match the luminance of the image produced by the respective projector. Alternatively, or in addition to this, the modulating means 78xy can be switched sequentially, with the flashing of the light source of the respective projector. This reduces flicker and spreads the power drain of the flashes more uniformly over time.

FIG. 8 shows a modulating means 78xy for each section of the source picture 76. Alternatively, the screen on which the image is to be projected can comprise a plurality of modulating means aligned to form rows or columns in the screen.

Figure 9:
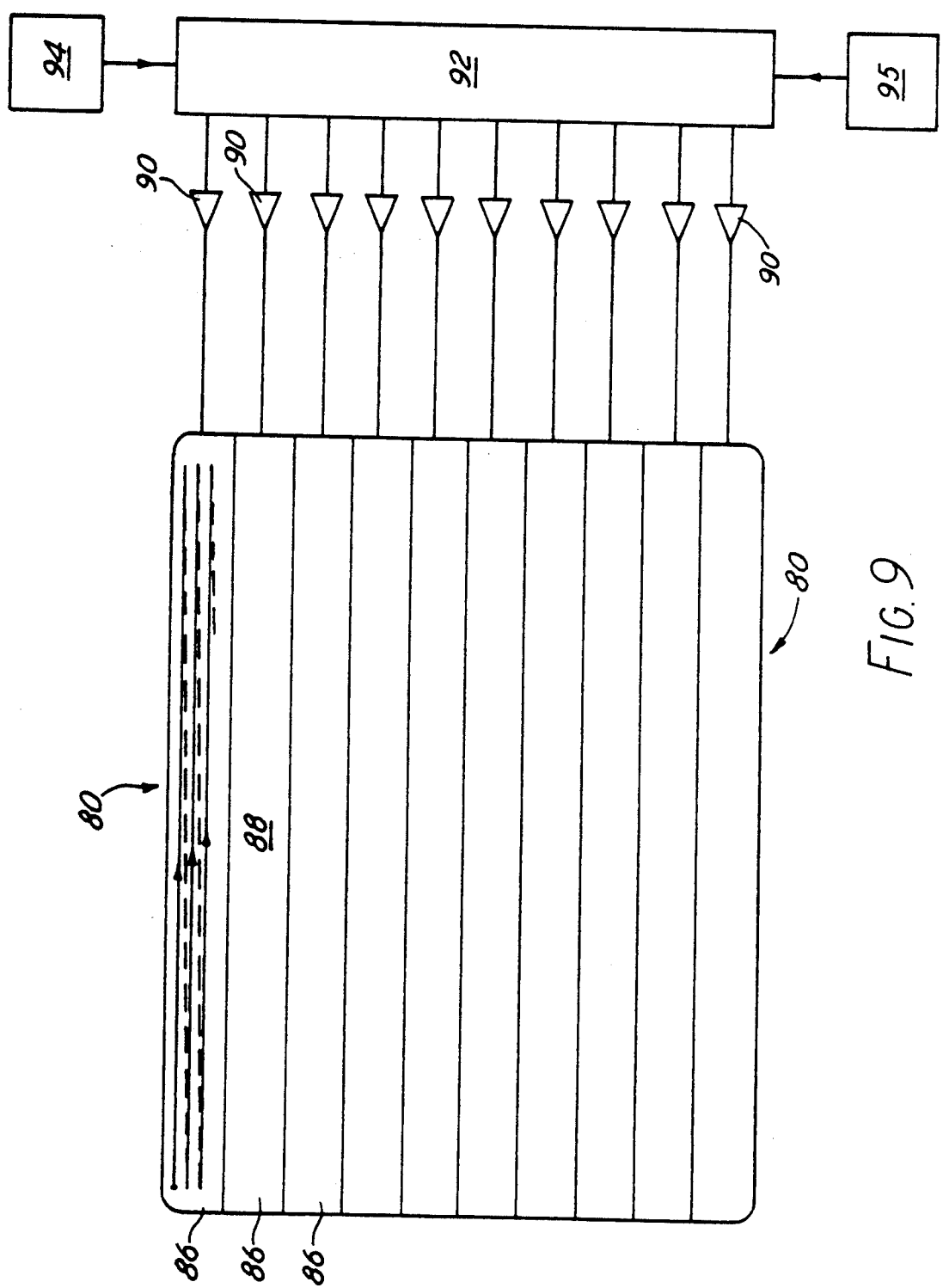
FIG. 9 shows a method of producing a projected image using a cathode ray tube raster scan.

FIG. 9 illustrates a further modification of the methods which can be used to project a scanned two-or three-dimensional modulated light pattern originating from a light source and represented by a matrix of pixels to form a projected pattern or image. Such a pattern can be produced using a scanned laser, a colour video projector or a cathode ray tube (CRT) based video projector (not shown). In a CRT based video projector, for example, (such as a beam-index type of colour CRT) an electron beam is rapidly moved to form a raster (large number of scanned parallel lines on a display face). The display face is covered by one or more phosphors which are excited to emit light by the electron beam. This light pattern which can be represented by a matrix of pixels is projected onto a defined surface provided by a modulating means 80.

As shown in FIG. 10, the modulating means 80 comprises a sheet 82 of NCAP material which goes from translucent to transparent when a potential difference is applied thereacross. One one side of the NCAP sheet is a plurality of horizontal strip indium tin oxide electrodes 86. Accordingly, the modulating means 80 is divided into a plurality of horizontal strip modulating means 88, each associated with a plurality of pixels, which can be operated between a first mode and a second mode independently of one another.

The operation of the strip modulating means 88 and the movement of the raster scan, which causes each pixel on the display face of the projector to act as a flashing source of light, are synchronised. The arrangement is such that (a) a respective modulating means 88 is in the first mode when its associated plurality of pixels are being scanned and (b) a respective plurality of pixels are not being scanned when its associated modulating means 88 is in the second mode.

As a pixel emits light, this is projected and incident on a particular strip modulating means 88 which is in the first mode, i.e. translucent, to form a reflective screen. The switching of each strip modulating means 88 is effected by respective drive electronics 90 connected to respective strip elecrodes 86. This is controlled by a drive waveform generator and selector 92 which has as inputs a synchronising signal 94 from the laser or CRT projector (e.g. via an infra-red link) and optionally a size/distance control 95 which can be varied depending on the separation of the modulating means 80 from the projector. The size/distance control 95 can be a manual control or an automatic control, using an ultrasonic or infra-red rangefinder, which adjusts the timing of the switching of different modulating means 88 to compensate for different sizes of pictures obtained at different separations of the modulating means 80 and projector. Alternatively, the projector has a zoom facility so that the same picture size can be obtained at different separations. An infra-red link may also be used to carry an audio signal from the projector to speakers at the screen.

At least a majority of those strip modulating means 88 on which light from the CRT projector is not incident are in the second mode and so transparent. Accordingly no light can be reflected from those strip modulating means 88 to an observer on the same side of the modulating means 80 as the projector (i.e. front projection). As with embodiment 1 described hereinbefore, in a preferred embodiment, a layer of material behind the modulating means 80 absorbs ambient light incident on the front surface of the modulating means 80 and also prevents ambient light from behind the modulating means being observed by the observer through those strip modulating means that are transparent. In this way, the majority of the area of the modulating means 80 not being utilised by light from the CRT projector is not effective to reflect any light back to the observer. Thus the noise produced by ambient light is reduced and the contrast between the required visual signal, i.e. the projected image, and this noise is improved.

This modification has been described with reference to a modulating means similar to that of embodiment 1. It is apparent that this modification can also be applied to the other embodiments described hereinbefore.

The method of the present invention is also beneficial to the production of visual signals other than projected images as described hereinafter.

Figure 11:
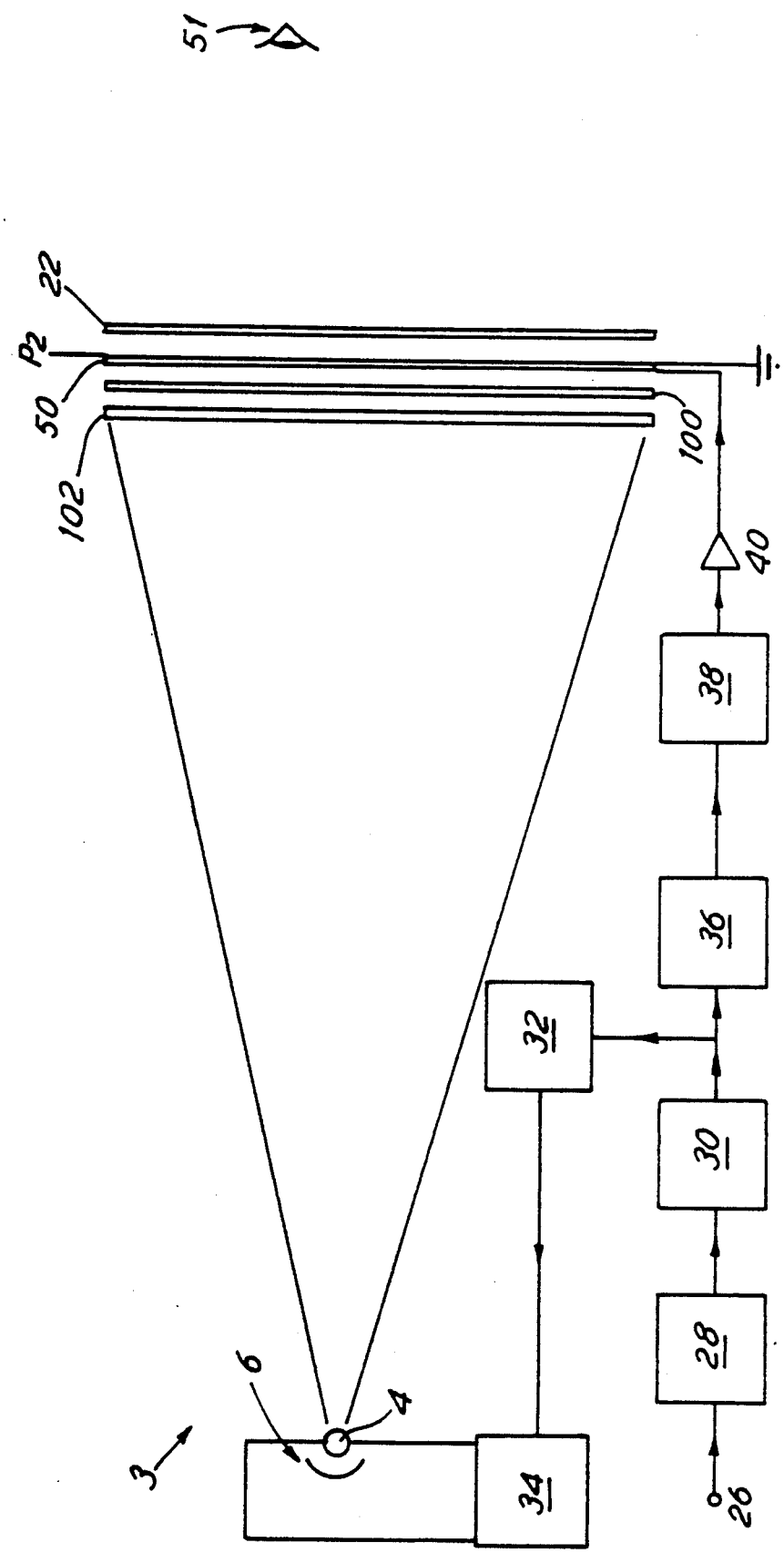
FIG. 11 shows a modification of the method of FIG. 4 to produce a back-illuminated screen.

The second method can be used to produce a required visual signal which is the appearance of transparent or translucent matter on a layer e.g. information on a backlit advertising hoarding, LCD or a road sign as shown in FIG. 11. The apparatus is similar to that of FIG. 4 and accordingly like parts are designated by like reference numerals. The information is provided on the defined surface of the screen 60. In the first mode, the modulating means 50 allows light from the flashing lamp 4 diffused by a translucent layer 102 to be incident on the screen 100 to illuminate the information. In the second mode, the modulating means is absorbing and so prevents ambient light incident on the front and back surfaces of the modulating means being respectively reflected to and transmitted towards the observer. Thus the contrast between the illuminated information, i.e. the required visual signal, and the noise produced by any ambient light is improved.

A similar effect can also be produced using the third method to illuminate a screen from the front, particularly for the case where it is required to change the colour of the illuminating light.

A related application for embodiment 1 is the production of a visual signal comprising an image projected onto printed information such as a map. At present, the production of such a signal is affected by the relative reflectivities of the inks used and the material on which the inks are printed. The method of the invention provides a modulating means having a first mode which is either translucent or opaque and reflective and a second mode which is transparent. This is overlaid on an opaque material carrying the required printed information.

Figure 12A:
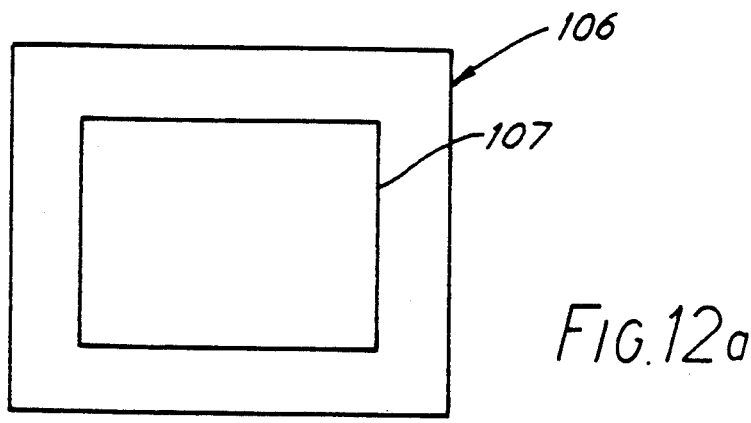
FIGS. 12a, 12b and 12c shows a method of producing a projected image superimposed on printed matter.
Figure 12B:
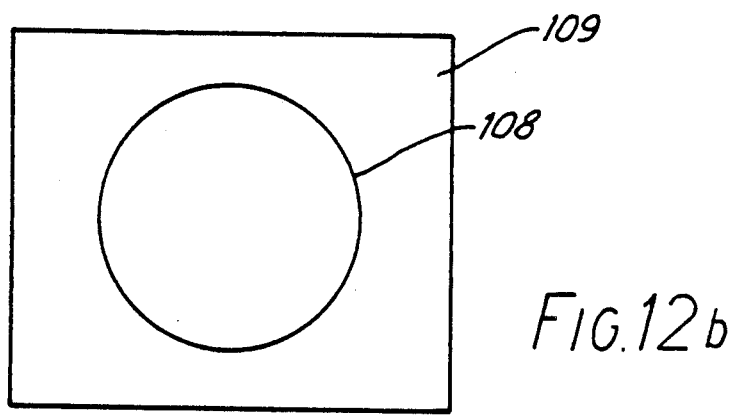
Figure 12C:
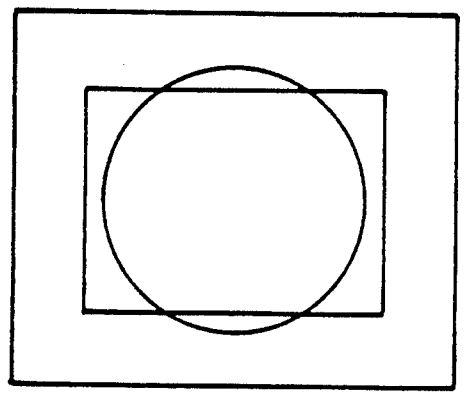

The method is shown schematically in FIG. 12. FIG. 12a shows the modulating means 106 in the first mode and so effective as a screen to provide a defined surface on which an image 107 is projected. FIG. 12b shows the modulating means in the second mode which is transparent and accordingly the printed matter 108 on the opaque material 109 is visible to the observer. As the modulating means 108 is switched between the first and second modes, the projected image 107 and the printed matter can be equally visible and so the resulting image seen by the observer is the combination shown in FIG. 12c. The reflectivity of the opaque screen and the printed matter 108 does not affect the appearance of the projected image 107 as this is projected not directly onto the opaque screen 109 but onto the screen of the modulating means in the first mode.

Another application of the invention can be considered generally under the concept of 'one-way windows'.

Figure 13:
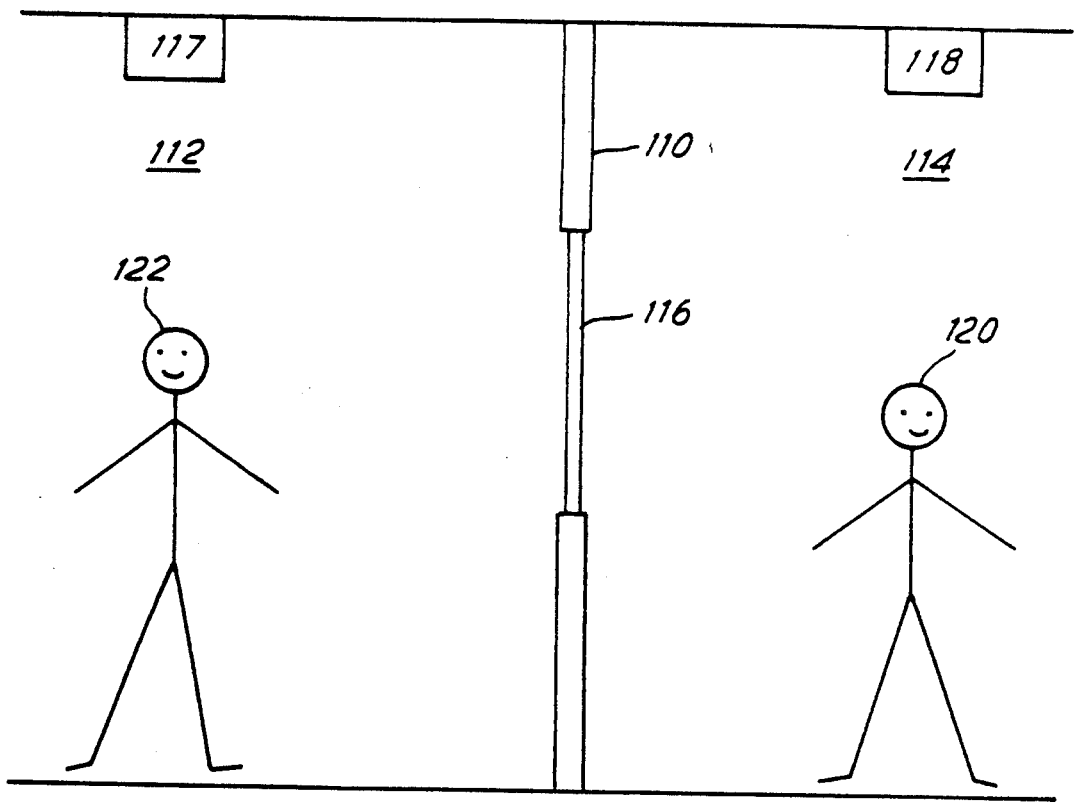
FIGS. 13 and 14 illustrate the use of the method to provide a 'one-way' window.

The concept is illustrated schematically in FIG. 13. A partition 110 between a first section 112 and a second section 114 comprises, at least in part, a modulating means 116. The modulating means 116 comprises an NCAP material and is switchable between a transparent mode and a non-transparent, e.g. translucent, mode. A first source of light 118 in the first section 112 illuminates the first section and a second source of light 118 in the second section 114 flashes at a frequency sufficiently high to eliminate flicker.

The operation of the modulating means 116 and the flashing of the second source 118 are synchronised such that the second source 118 is off when the modulating means is the transparent mode, and on when the modulating means is in the non-transparent mode. Accordingly, an observer 120 in the second section 114 is able to observe the appearance of the first section 112 when the modulating means is transparent while he remains in the illuminated environment of the second section 114. A person 122 in the second section, however sees a translucent, i.e. frosted window when the modulating means 116 is in the non-transparent mode and the second source 118 is on but sees darkness when the modulating means 116 is in the transparent mode. Accordingly, the integral effect seen by the person 122 is a frosted window.

The effect of such a one-way window can be improved by providing a half-silvered mirror in addition to the modulating means. Alternatively, or in addition, the modulating means in the non-transparent mode can be absorbing. The combination of a dyed NCAP sheet and an ordinary NCAP sheet can be used—the two sheets being transparent at the same time.

Such a one-way window can be used in many areas. One area is for security when a security guard wishes to see into a room without being observed. Another area is motor vehicles at night in which the passengers wish to have sufficient light to see but the driver wishes to be able to see through a darkened passenger area so as to be able to see out of the rear window—the modulating means would be opaque and absorbing in the non-transparent mode and placed between the driver and the passenger area. Similarly, such a modulating means used in the outside windows with a flashing source of light in the motor vehicle would prevent light from inside the motor vehicle distracting drivers of other motor vehicles.

Figure 14:
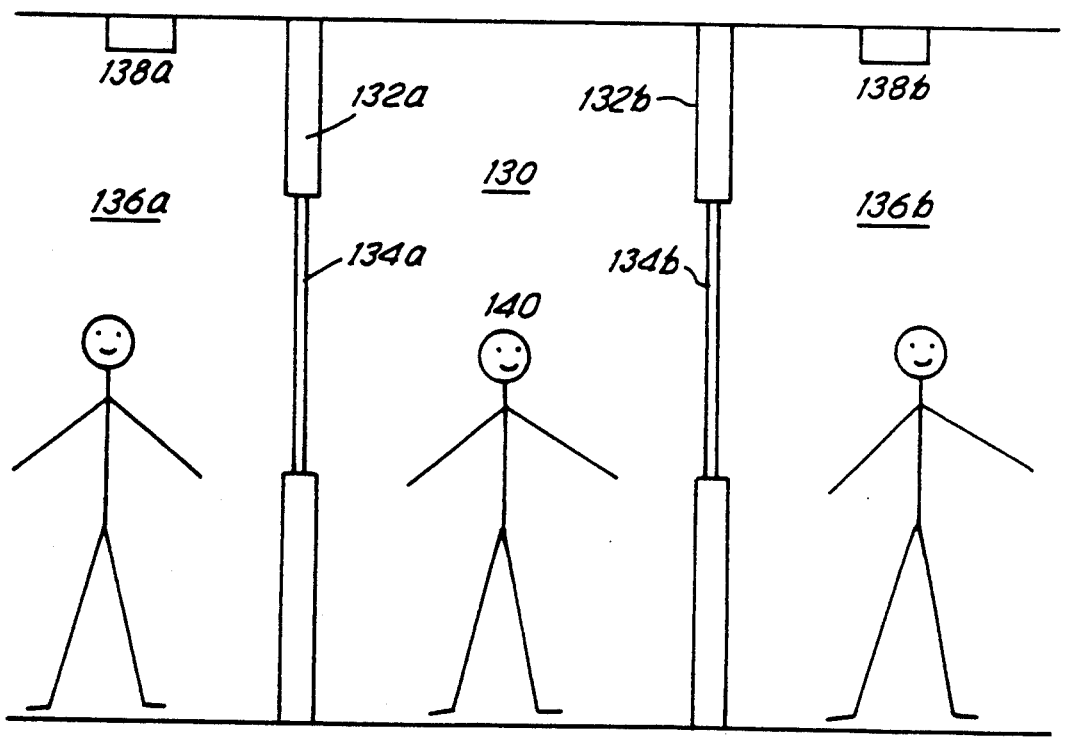

Another variation of this concept is shown in FIG. 14. A corridor 130 is defined by a first partition 132a and a second partition 132b, each comprising, at least in part, a respective modulating means 134a, 134b. The respective sections 136a, 136b on the other side of the partitions 132a, 132b are each illuminated by a source of light 138a, 138b flashing at a sufficiently high frequency to eliminate flicker. Each modulating means 134a, 134b is operable between a transparent mode and a non-transparent mode.

The switching of each modulating means 134a, 134b is synchronised with the flashing of the respective source of light 138a, 138b such that the light is on when the modulating means 134a, 134b is transparent and off when the modulating means is non-transparent. Accordingly, each section 136a, 136b appears to be continuously illuminated. However, the flashing of the sources of light 138a, 138b are in antiphase with each other, so that the modulating means 134a of the first partition 132a is non-transparent when the modulating means 134b of the second partition 132b is transparent and vice versa. Thus, an observer 140, e.g. a nurse, in the corridor 130 is able to observe the appearance of the two sections 136a, 136b from the corridor. However, the privacy of people in the two sections 136a, 136b from each other is preserved as the two modulating means 134a, 134b are not transparent simultaneously.

The invention covers a wide range of methods and concepts. Other embodiments within the scope of the present invention will be apparent to those skilled in the art.

In particular, it is envisaged the three methods described for enhancing the contrast between an image projected onto a defined surface such as a screen and the noise produced by ambient light scattered from that defined surface can be modified to produce a three dimensional image, e.g. a hologram, in a defined region.

I claim:

1. A method of producing a required visual signal for direct observation from a first source of light in the presence of a second source of light, the method including the steps of:
   transmitting light from said first source to produce a required visual signal on a defined surface distant from said first source;
   operating a means for modulating light between at least a first mode and a second mode;
   and varying the intensity of at least one of the sources of light at or above a given frequency;
   wherein the operation of the modulating means and the varying of said intensity are synchronized so that said modulating means in said first mode allows the required visual signal to be directly observed on said defined surfaces and said modulating means in said second mode allows the effect produced by any light from said second source incident on said defined surface to be reduced and said given frequency is equal to or greater than the critical fusion frequency for the size and luminance of said required visual signal.

2. A method according to claim 1 wherein said at least one of the sources of light comprises said first source, and the operation of said modulating means and the varying of said intensity are synchronised so that said modulating means is in said first mode when said first source emits more light and said first source emits less light when said modulating means is in said second mode.

3. A method according to claim 2 wherein said first source of light comprises a plurality of sources of light and the method further comprises the step of varying the intensity of each of said plurality of sources of light with a different phase, the arrangement being such that each of said plurality of sources of light is energised at a different time.

4. A method according to claim 3 wherein a plurality of said modulating means are used, at least one of said plurality of sources being associated with each said modulating means such that switching of each said modulating means is synchronized with the varying of the intensity of its associated at least one of said plurality of sources.

5. A method according to claim 1 wherein said at least one of the sources of light comprises said second source and the operation of said modulating means and the varying of said intensity are synchronised so that said second source emits more light when said modulating means is in said second mode than when said modulating means is in said first mode.

6. A method according to claim 5 wherein the step of varying the intensity of said second source comprises the step of switching an optical shutter between an absorbing mode and a non-absorbing mode, the optical shutter being positioned between said second source and said defined surface or said defined region.

7. A method according to claim 1 wherein said modulating means is transparent in said first mode and non-transparent in said second mode and said modulating means forms at least part of a partition between a first section containing said first source and a second section containing said second source, said at least one of the sources comprising said second source whereby said second section is illuminated by said second source when said modulating means is non-transparent and said first section is illuminated by said first source.

8. A method according to claim 7 wherein said at least one of the sources comprises said first source and said second source, and the method further comprises the step of switching another means for modulating light between a transparent mode and a non-transparent mode, the another modulating means forming at least part of another partition between said first section and said second section, said another modulating means being in said transparent mode when said modulating means is in said non-transparent mode and vice-versa.

9. An apparatus for use in a method of producing a required visual signal on a defined surface for direct observation from a first source of light in the presence of a second source of light, the apparatus comprising means for modulating light, the modulating means having at least a first mode and a second mode, in use, said modulating means in said first mode allowing the required visual signal to be directly observed on a said defined surface distant from a said first source and said modulating means in said second mode allowing the effect produced by any light from said second source incident on said defined surface to be reduced and said modulating means being operable between said first mode and said second mode at or above a given frequency equal to or greater than the critical fusion frequency for the size and luminance of a said required visual signal.

10. An apparatus according to claim 9 wherein the intensity of at least one of said first source and said second source can be varied at or above a frequency equal to or greater than said critical fusion frequency, the apparatus further comprising mans for synchronizing the varying of intensity of said at least one source with the operation of said modulating means.

11. An apparatus according to claim 10 further comprising said first source and means for varying the intensity of said first source.

12. An apparatus according to claim 9 wherein said modulating means in said first mode forms a scattering screen to provide said defined surface.

13. An apparatus according to claim 12 wherein said modulating means in said first mode forms a reflective screen.

14. An apparatus according to claim 13 further comprising a layer on the other side of said modulating means from said first source.

15. An apparatus according to claim 14 wherein the layer is reflective when viewed from one direction and absorbing when viewed from the other direction.

16. An apparatus according to claim 15 wherein the layer comprises a louvred panel and a reflective layer.

17. An apparatus according to claim 9 further comprising a screen for distributing light to provide said defined surface, said modulating means forming an optical shutter, being transmissive in said first mode and non-transmissive in said second mode.

18. An apparatus according to claim 17 wherein said modulating means is a layer containing a liquid crystal material.

19. An apparatus according to claim 18 wheren said modulating means comprises a polymer film containing microdroplets of the liquid crystal material.

20. A method of producing a required visual signal for direct observation from a first source of light, the method including the steps of:
transmitting light from said first source to produce a required visual signal in a defined region distant from said first source;
operating a means for modulating light between at least a first mode and a second mode; and varying the intensity of at least one of said first source or a second source of light at or above a given frequency;
wherein the operation of the modulating means and the varying of said intensity are synchronized so that said modulating means in said first mode allows the required visual signal to be directly observed in said defined region and said modulating means in said second mode allows the effect produced by any light from said second source incident in said defined region to be reduced and said given frequency is equal to or greater than the critical fusion frequency for the size and luminance of said required visual signal.

21. A method according to claim 20 wherein at least one of the sources of light comprises said first source, and the operation of said modulating means and the varying of said intensity are synchronized so that said modulating means is in said first mode when said first source emits more light and said first source emits less light when said modulating means is in said second mode.

22. A method according to claim 21 wherein said first source of light comprises a plurality of sources of light and the method further comprises the step of varying the intensity of each of said plurality of sources of light with a different phase, the arrangement being such that each of said plurality of sources of light is energized at a different time.

23. A method according to claim 22 wherein a plurality of said modulating means are used, at least one of said plurality of sources being associated with each said modulating means such that switching of each said modulating means is synchronized with the varying of the intensity of its associated one of said plurality of sources.

24. A method according to claim 20 wherein at least one of the sources of light comprises said second source and the operation of said modulating means and the varying of said intensity are synchronized so that said second source emits more light when said modulating means is in said second mode when said modulating means is in said first mode.

25. A method according to claim 24 wherein the step of varying the intensity of said second source comprises the step of switching an optical shutter between an absorbing mode and a non-absorbing mode, an optical shutter being positioned between said second source and said defined regional.

26. A method according to claim 20 wherein said modulating means is transparent in said first mode and non-transparent in said second mode and said modulating means forms at least part of a partition between a first section containing said first source and a second section containing said second source, said at least one of the sources comprising said second source whereby said second section is illuminated by said second source when said modulating means is non-transparent and said first section is illuminated by said first source.

27. A method according to claim 26 wherein said at least one of the sources comprises said first source and second source, and the method further comprises the step of switching another means for modulating light betweena transparent mode and a non-transparent mode, the another modulating means forming at least part of another partition between said first section and said second section, said another modulating means being in said transparent mode when said modulating means is in said non-transparent mode and said anothe modulating means being in said non-transparent mode when said modulating means is in said transparent mode.

28. An apparatus for use in a method of producing a required visual signal in a defined region for direct observation from a first source of light in the presence of a second source of light, the apparatus comprising means for modulating light, the modulating means having at least a first mode and a second mode, in use, said modulating means in said first mode allowing the required visual signal to be directly observed in a said defined region distant from said first source and said modulating means in said second source incident in said defined region to be reduced and said modulating means being operable between said first mode and said second mode at or above a given frequency equal to or greater than a critical fusion frequency for the size and luminance of a said required visual signal.

29. An apparatus according to claim 28 wherein the intensity of at least one of said first source and said second source can be varied at or above a frequency equal to or greater than said critical fusion frequency, the apparatus further comprising means for synchronizing the varying of intensity of said at least one source with the operation of said modulating means.

30. An apparatus according to claim 29 further comprising said first source and means for varying the intensity of said first source.

* * * * *